United States Patent
Orihara et al.

(10) Patent No.: US 10,444,742 B2
(45) Date of Patent: Oct. 15, 2019

(54) MATERIAL RECOMMENDATION APPARATUS

(71) Applicant: KABUSHIKI KAISHA TOSHIBA, Minato-ku, Tokyo (JP)

(72) Inventors: Ryohei Orihara, Tokyo (JP); Yuichi Miyamura, Yokohama Kanagawa (JP); Ayana Yamamoto, Yokohama Kanagawa (JP); Masayuki Okamoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 15/392,434

(22) Filed: Dec. 28, 2016

(65) Prior Publication Data
US 2017/0227951 A1  Aug. 10, 2017

(30) Foreign Application Priority Data
Feb. 9, 2016  (JP) .................................. 2016-022991

(51) Int. Cl.
*G05B 19/00* (2006.01)
*G05B 19/418* (2006.01)

(52) U.S. Cl.
CPC . *G05B 19/41885* (2013.01); *G05B 19/41865* (2013.01); *G05B 2219/32028* (2013.01); *G05B 2219/32082* (2013.01); *G05B 2219/32203* (2013.01); *G05B 2219/45031* (2013.01); *Y02P 80/40* (2015.11); *Y02P 90/20* (2015.11); *Y02P 90/22* (2015.11); *Y02P 90/26* (2015.11)

(58) Field of Classification Search
None
See application file for complete search history.

(56) References Cited

U.S. PATENT DOCUMENTS 4,912,063 A * 3/1990 Davis ................ H01L 21/02378
117/101
8,316,001 B1  11/2012 Albrecht et al.
(Continued)

FOREIGN PATENT DOCUMENTS

JP  H 06-243132 A   9/1994
JP  H 07-334574 A  12/1995
(Continued)

OTHER PUBLICATIONS

U.S. Appl. No. 15/260,759, filed Sep. 9, 2016, Miyamura et al.
(Continued)

*Primary Examiner* — Paul B Yanchus, III
(74) *Attorney, Agent, or Firm* — Knobbe, Martens, Olson & Bear, LLP

(57) ABSTRACT

According to an embodiment, a material recommendation apparatus includes an extractor, a creator, a matcher and a recommender. The extractor extracts information about a substance as a candidate for a material for an industrial product, a property of the substance, and a report time of the property from an electronic document. The creator creates, for each substance, time series data in which the property is associated with the report time. The matcher matches the time series data with a pattern. The recommender recommends, as the material, a substance corresponding to time series data that matches the pattern.

10 Claims, 3 Drawing Sheets

(56) References Cited

U.S. PATENT DOCUMENTS

| | | | |
|---|---|---|---|
| 8,566,360 | B2 | 10/2013 | Chen |
| 8,645,391 | B1 | 2/2014 | Wong et al. |
| 9,898,464 | B2 | 2/2018 | Okamoto et al. |
| 2002/0002567 | A1 | 1/2002 | Kanie et al. |
| 2005/0160086 | A1 | 7/2005 | Haraguchi et al. |
| 2005/0251738 | A1 | 11/2005 | Hirano et al. |
| 2006/0282442 | A1 | 12/2006 | Lennon et al. |
| 2009/0077122 | A1 | 3/2009 | Fume et al. |
| 2010/0076991 | A1 | 3/2010 | Nakano et al. |
| 2012/0030157 | A1 | 2/2012 | Tsuchida et al. |
| 2013/0013291 | A1 | 1/2013 | Bullock et al. |
| 2013/0029478 | A1* | 1/2013 | Zhang .................. H01L 21/84 438/479 |
| 2013/0066912 | A1 | 3/2013 | Chetuparambil et al. |
| 2013/0076751 | A1 | 3/2013 | Jung et al. |
| 2013/0179381 | A1 | 7/2013 | Kawabata et al. |
| 2013/0246048 | A1 | 9/2013 | Nagase et al. |
| 2014/0032513 | A1 | 1/2014 | Gaither |
| 2014/0372257 | A1 | 12/2014 | Nishioka |
| 2016/0055196 | A1 | 2/2016 | Collins et al. |
| 2016/0140389 | A1 | 5/2016 | Okamoto et al. |
| 2017/0091289 | A1 | 3/2017 | Ohazulike et al. |
| 2017/0124067 | A1 | 5/2017 | Okamoto et al. |
| 2018/0137435 | A1 | 5/2018 | Okamoto et al. |

FOREIGN PATENT DOCUMENTS

| | | |
|---|---|---|
| JP | H 09-325962 A | 12/1997 |
| JP | H 11-167576 A | 6/1999 |
| JP | 2001-134600 A | 5/2001 |
| JP | 2002-024211 A | 1/2002 |
| JP | 2002-056354 A | 2/2002 |
| JP | 2003-044481 A | 2/2003 |
| JP | 2003-167870 A | 6/2003 |
| JP | 2004-128903 A | 4/2004 |
| JP | 2005-100082 A | 4/2005 |
| JP | 2005-190338 A | 7/2005 |
| JP | 2006-065387 A | 3/2006 |
| JP | 2010-205218 A | 9/2010 |
| JP | 2010-218209 A | 9/2010 |
| JP | 4565106 B2 | 10/2010 |
| JP | 2011-108085 A | 6/2011 |
| JP | 2013-073619 A | 4/2013 |
| JP | 2013-105321 A | 5/2013 |
| JP | 2013-143039 A | 7/2013 |
| JP | 2013-196374 A | 9/2013 |
| JP | 5341276 B1 | 11/2013 |
| JP | 5356197 B2 | 12/2013 |
| JP | 2014-106611 A | 6/2014 |
| JP | 2014-137722 A | 7/2014 |
| JP | 2016-099741 A | 5/2016 |
| JP | 2017-091000 A | 5/2017 |
| WO | WO 2010/119615 A1 | 10/2001 |
| WO | WO 2014/081012 A1 | 5/2014 |

OTHER PUBLICATIONS

U.S. Appl. No. 15/343,914, filed Nov. 4, 2016, Okamoto et al.
U.S. Appl. No. 15/420,834, filed Jan. 31, 2017, Nakata.
Milkov Thomas, et al. "Efficient Estimation of Word Representations in Vector Space", arXiv:1301.3781, Sep. 2013.
Ciravegna, F., "Adaptive Information Extraction from Text by Rule Induction and Generalisation", Proceedings of IJACI—2001.

* cited by examiner

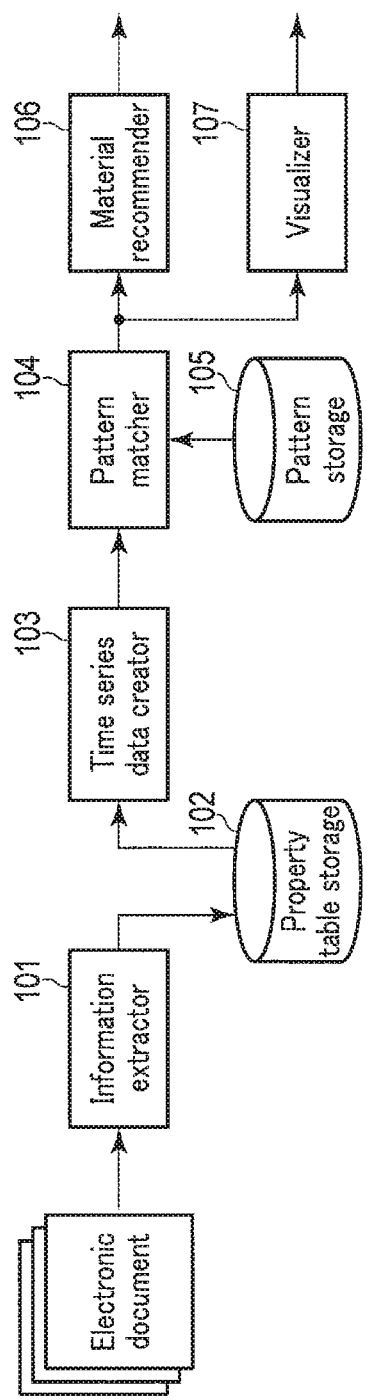
F I G. 1

| Document | Substance | Mobility | Carrier type | Time of report | Author |
|---|---|---|---|---|---|
| Paper 1 | $TiO_2$ | 0.05 | Electron | 2010 | Author 1 |
| Paper 2 | 4H-SiC | 37.0 | Electron | 2004 | Author 2 |
| Paper 2 | AlGaN | 50.0 | Electron | 2004 | Author 2 |
| Paper 2 | n-AlGaN | 50.0 | Electron | 2004 | Author 2 |
| Paper 3 | $ZnO/Mg_{0.2}Zn_{0.8}O$ | 110.0 | Electron | 2009 | Author 3 |
| Paper 4 | AlGaN | 0.85 | Electron | 2004 | Author 4 |
| Paper 4 | GaAs | 0.85 | Electron | 2004 | Author 4 |

```
for each M in (set_of_materials) {
  report[M] = 0 ;
  if (number_of(doc([material=M,carrier='electron',mobility> 0]))>0 &&
    number_of(doc([material=M,carrier='hole',mobility> 0]))>0) {
      report[M] = 1;
  }
}
return report;
```

MATERIAL RECOMMENDATION APPARATUS

CROSS-REFERENCE TO RELATED APPLICATIONS

This application is based upon and claims the benefit of priority from Japanese Patent Application No. 2016-022991, filed Feb. 9, 2016, the entire contents of which are incorporated herein by reference.

FIELD

Embodiments relate to the techniques to recommend materials for industrial products.

BACKGROUND

For industrial products, e.g., semiconductor devices, selection of materials is one of the decision-making events that will largely influence the performance of the products. As such, especially in order to win the race of technology development, it is an ongoing demand to be the first to spot a promising new material and work toward its practical use. Properties of substances are reported in academic journals and conference papers, so if they can be monitored continuously and comprehensively, it is possible to quickly search out a substance that can be a candidate for the new material with properties suitable for a desired industrial product. However, unless experts having advanced knowledge dedicate an enormous amount of their time to such a search, extracting the necessary information from the vast amount of papers is difficult.

For example, related to consumable goods such as home electric appliances and automobiles, systems have been in practical use which are intended to ascertain quality problems early on by extracting reviews of each product from a stack of consumer comments posted on the Web and analyzing the extracted reviews as time series data. Also, systems have been proposed which calculate the degree of association among genes, compounds, and diseases from documentary information and estimate the significance of genes and compounds to diseases based on the calculated degree. These systems have a commonality in extracting the necessary information from extensive text-based information to support decision-making.

However, taking into account the following, it is not easy to utilize these systems to find a substance that can be a candidate for a new material with properties suitable for a desired industrial product from extensive text-based information. For example, properties to be considered vary depending on the use of a material, so as to which property should be extracted is not apparent information. Also, even if a property to be considered is known, it is not apparent what kind of information about that property, when extracted, would allow for a judgment that the substance is sufficiently matured for practical use as the material.

BRIEF DESCRIPTION OF THE DRAWINGS

FIG. 1 is a block diagram showing an example of the material recommendation apparatus according to a first embodiment.

DETAILED DESCRIPTION

Figures 2, 3:
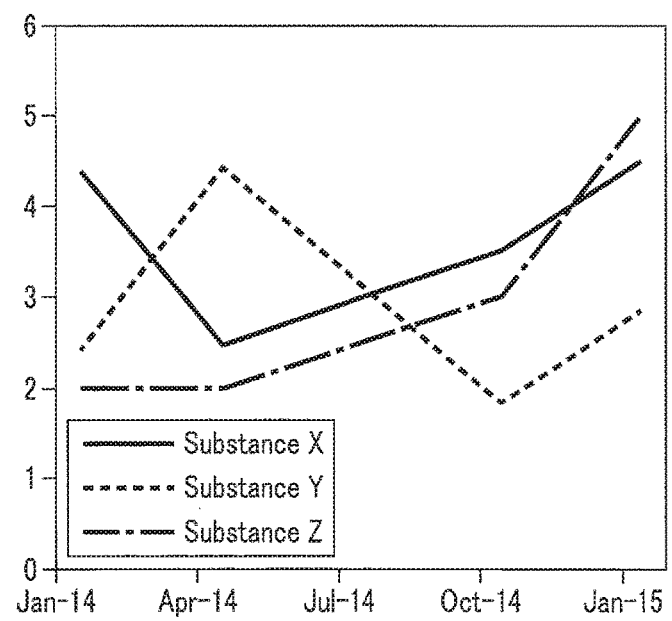
FIG. 2 shows an example of the property table stored in the property table storage in FIG. 1.
FIG. 3 is a graph chart showing an example of the curves obtained by plotting the time series data created by the time series data creator in FIG. 1.

Hereinafter, embodiments will be described with reference to the drawings.

According to an embodiment, a material recommendation apparatus includes an extractor, a creator, a matcher and a recommender. The extractor extracts information about a substance as a candidate for a material for an industrial product, a property of the substance, and a report time of the property from an electronic document. The creator creates, for each substance, time series data in which the property is associated with the report time. The matcher matches the time series data with a pattern. The recommender recommends, as the material, a substance corresponding to time series data that matches the pattern.

Hereinafter, the same or similar elements to already-described elements will be denoted by the same or similar reference symbols, and redundant descriptions will basically be omitted.

First Embodiment

As shown in FIG. 1, a material recommendation apparatus according to the first embodiment comprises an information extractor 101, a property table storage 102, a time series data creator 103, a pattern matcher 104, a pattern storage 105, a material recommender 106, and a visualizer 107.

The information extractor 101 receives electronic documents. An electronic document refers to computer-readable text data, which is typically an electronic version of a document such as a journal or conference paper in the field where properties of substances are discussed (e.g., applied physics, material engineering, biology, chemistry, etc.). Electronic documents are not necessarily limited to documents available in electronic form, but may be documents which have been prepared by converting documents provided as paper media into an electronic form manually, or through optical character recognition (OCR), etc.

From the electronic documents, the information extractor 101 extracts information about a substance that can be a candidate of the material for an industrial product, a property of the substance, and a time of report of this property. The time of report may be, for example, a date of preparation, publication, etc. of the electronic document, or may be a date of an experiment mentioned in the electronic document. The information extractor 101 adds an entry including the extracted information to a property table stored in the property table storage 102.

The information extractor 101 may adopt, for example, an information extraction technique which is a type of natural-language processing technique to extract desired information from documents written in natural languages. Specifically, the information extractor 101 may extract a substance (entity)-property relationship by performing the relationship extraction described below.

The information extractor 101 applies preprocessing, such as basic natural-language processing (e.g., morphological analysis, named entity extraction, etc.), to the electronic documents. Then, the information extractor 101 extracts substance information (surface expressions) from the preprocessed electronic documents. In this instance, the substance information is not limited to information about single compounds (content ratio may be an integer number or a decimal number), but may include information such as a laminate structure of multiple compounds and abbreviations used only in the subject electronic document (e.g., $LaAlO_3$ referred to as LAO).

Also, the information extractor 101 associates the extracted substance information with an entity of the substance. This corresponds to the processing of consolidating different surface expressions that represent the same entity. For example, ethyl alcohol and ethanol may be both associated with the same entity.

The information extractor 101 also extracts property information from the preprocessed electronic documents. The property to be extracted is, for example, predetermined according to the use of a target material. Specifically, if the target is a material for semiconductor devices, the property is determined to be a combination of the mobility of a carrier and the type of the carrier (i.e. electron or hole), a band gap, and so on. The information extractor 101 may further extract supplementary information about the property, such as experimental conditions (temperature of usage environment, manufacturing temperature, etc.).

Next, the information extractor 101 extracts a relationship between the extracted substance (entity) and the property. For example, the information extractor 101 may acquire a candidate of the relationship by combining the extracted substance and the extracted property. The information extractor 101 may also calculate a score (probability value) indicative of probability for each relationship candidate and exclude the candidates with a high possibility of representing a wrong relationship.

The relationship extraction described here may utilize a platform called DeepDive (see http://deepdive.stanford.edu/index.html).

The property table storage 102 stores property tables. A property table is constructed based on the information extracted by the information extractor 101. Each entry in the property table includes at least information about a substance, a property of the substance, and a report time of the property. The property tables are read by the time series data creator 103.

FIG. 2 shows a specific example of the property table. Each entry in the property table includes the information about a substance, a property of the substance (mobility of a carrier and the type of the carrier), and a report time of the property. Each entry in the property table further includes information about a document from which the property information has been extracted, an author of the document, and so on. Filtering operations using such information will allow for the later-described pattern matching with, for example, the property information extracted from the documents of a particular author (e.g., famous researcher or research group) selected.

The time series data creator 103 reads the property table from the property table storage 102 and creates time series data in which the property is associated with the report time for each substance. The time series data creator 103 may create, for example, time series data indicative of the transition of reported electron mobility and time series data indicative of the transition of reported hole mobility for each substance. The time series data creator 103 outputs the created time series data to the pattern matcher 104.

The pattern matcher 104 receives the time series data from the time series data creator 103 and reads at least one pattern from the pattern storage 105 described later. The pattern defines a condition which is presumed to be satisfied by a substance once the substance is sufficiently matured for practical use as a target material.

Specifically, the pattern matcher 104 may use a pattern relating to the numerical values of time series data. In this instance, the pattern may be described in a programming language or, if the pattern matcher 104 can use an interpreter (not shown), may be described in a natural language that can be interpreted by the interpreter.

Figures 4, 5:
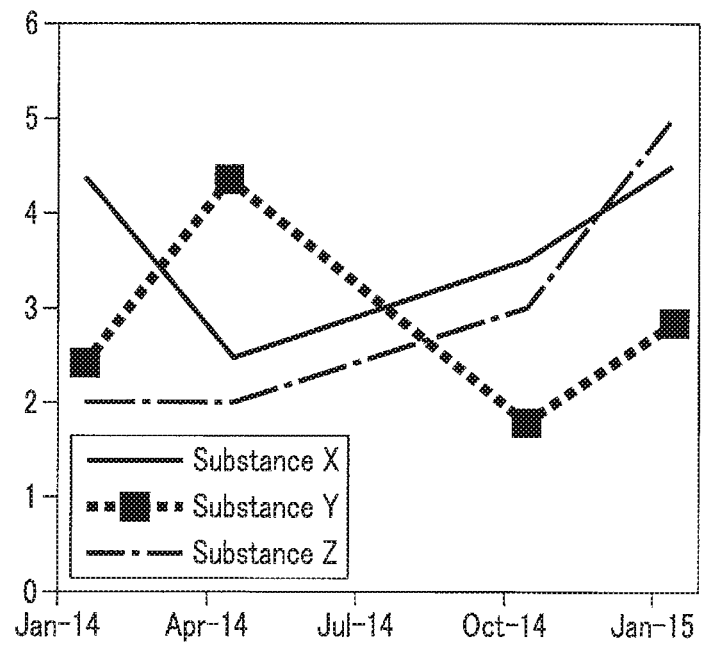
FIG. 4 shows an example of the highlighting performed by the visualizer in FIG. 1.
FIG. 5 shows an example of the pattern stored in the pattern storage in FIG. 1.

For example, the pattern matcher 104 may determine that time series data matches a pattern if the extracted number of hole mobilities in the time series data is greater than a first threshold (e.g., 0) and the extracted number of electron mobilities in the time series data is greater than a second threshold (e.g., 0). The pattern defining such a condition can be described using a programming language as exemplified by FIG. 5.

This pattern represents the know-how that no matter how much information about the mobility of one carrier, either electron or hole, of a substance has been extracted from electronic documents, it cannot be judged that the substance is sufficiently matured for practical use as a material for semiconductor devices if the information about the mobility of the other carrier has not been extracted from any of the electronic documents. Note that in the example in FIG. 5, both the thresholds for the extracted number of hole mobilities and the extracted number of electron mobilities are set to 0, but they may be independently set to a value equal to or greater than 1.

Also, the pattern matcher 104 may determine that time series data matches a pattern if the variance of the mobilities of at least one of the holes and electrons in the time series data is equal to or less than a threshold. The pattern matcher 104 may continuously monitor the variance of mobilities in the most recent fixed-length period by, for example, calculating the variance using a moving window in the time-axis direction.

Carrier mobilities largely vary during the time shortly after the start of research about a substance, but the variations tend to settle as the research about the substance becomes sufficiently matured. In other words, if the variance of carrier mobilities of a substance is sufficiently small, it may be determined that the substance is sufficiently matured for practical use as a material for semiconductor devices.

Incidentally, when the information extractor 101 has extracted supplementary information about the property such as experimental conditions, it is also effective to make the conditions defined by a pattern stricter by using these experimental conditions. For example, if a property of a substance has been identified as a result of experimentation under an impractical environment in view of the usage or manufacturing environment of an industrial product, the substance cannot be determined to be sufficiently matured for practical use as the intended material.

Thus, for example, the pattern matcher 104 may determine that time series data matches a pattern if the extracted number of hole mobilities in the time series data, associated with experimental conditions satisfying a first criteria, is greater than a first threshold and the extracted number of electron mobilities in the time series data, associated with experimental conditions satisfying a second criteria, is greater than a second threshold. In this instance, the first criteria and the second criteria may define that at least one of the usage environment temperature and manufacturing temperature of the substance falls within the allowable range (e.g., around room temperature).

Alternatively, the pattern matcher 104 may also use a pattern relating to the shape of a curve obtained by plotting time series data (see, for example, FIG. 3). In this instance, the pattern may be graphic data representing the shape of an ideal curve. The pattern matcher 104 may determine that the time series data matches a pattern if the shape of the curve obtained by plotting the time series data is similar to the shape of the curve represented by the pattern (for example, if the similarity is equal to or greater than a threshold).

The pattern matcher 104 checks if the time series data matches a pattern. If the time series data matches any of the patterns, the pattern matcher 104 outputs the time series data to the material recommender 106 and the visualizer 107.

The pattern storage 105 stores at least one predetermined pattern in the form of, for example, a source code, natural language text which can be interpreted by an interpreter, and graphic data. Patterns are read by the pattern matcher 104.

The material recommender 106 receives time series data having matched a pattern from the pattern matcher 104. The material recommender 106 recommends a substance corresponding to this time series data as a new material for desired industrial products. For example, the material recommender 106 may cause a display (not shown) to present a text indicating that the substance is recommended.

The visualizer 107 receives the time series data having matched a pattern from the pattern matcher 104. The visualizer 107 visualizes the time series data by causing a display (not shown) to highlight the time series data. The visualizer 107 may further display time series data which has not matched the pattern as a comparison subject.

Specifically, the visualizer 107 may display a property of the time series data which has matched a pattern in a different manner (e.g., in a different line type, color, or thickness of the graph, or in a different color or size of the font) from a property of the time series data which has not matched the pattern. In the example shown in FIG. 4, the visualizer 107 highlights the line graph of substance Y by using a thicker line than the line graphs of substance X and substance Z and by clearly indicating the points on the graph.

As described above, the material recommendation apparatus according to the first embodiment analyzes electronic documents, creates time series data in which a property is associated with a report time for each substance, matches the time series data with a pattern, and recommends the substance corresponding to the time series data which has matched the pattern as a new material. Therefore, with this material recommendation apparatus, it is possible to automatically extract candidates of a new material for desired industrial products without requiring an advanced level of knowledge for comprehending the contents of academic journals or conference papers, or know-how for extracting the necessary information from such documents, or the like. That is, enormous human costs which were required to search for a new material can be reduced.

(Modifications)

Note that the pattern matcher 104 described above may also function as a maturity estimator to estimate the maturity of a substance associated with time series data which has matched any pattern. The maturity estimator may, for example, estimate that the smaller the variance of a property such as carrier mobilities, the higher the maturity of a substance. Also, the maturity estimator may estimate that the longer the time elapsed since time series data first matches any pattern, the higher the maturity of a substance corresponding to the time series data.

When there are multiple time series data having matched a pattern, the material recommender 106 may recommend a substance having the highest maturity, or may recommend substances ranked in descending order of maturity. Additionally, a substance showing an excessively high maturity might be already obsolete, so the material recommender 106 may exclude such a substance from the subjects of recommendation.

Similarly, when there are multiple time series data having matched a pattern, the visualizer 107 may change the degree of highlighting depending on the level of maturity. As discussed above, a substance showing an excessively high maturity might be already obsolete, so the visualizer 107 may exclude such a substance from the subjects of visualization.

Various functional units described in the above embodiments may also be realized using circuits. The circuits may be circuits of exclusive use for specific functions, or may be circuits of general use such as a processor.

At least a part of the processing in the above-described embodiments can be implemented using a general-purpose computer as basic hardware. A program implementing the processing in each of the above-described embodiments may be stored in a computer readable storage medium. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A material recommendation apparatus comprising:
an extractor implemented by one or more hardware processors which extracts information about a substance as a candidate for a material for an industrial product, a property of the substance, and a report time of the property from an electronic document;
a creator implemented by one or more hardware processors which creates, for each substance, time series data in which the property is associated with the report time;
a matcher implemented by one or more hardware processors which matches the time series data with a pattern, wherein the pattern defines a condition which is satisfied by a first substance once the first substance is matured for practical use as the material; and
a recommender implemented by one or more hardware processors which recommends, as the material, a substance corresponding to time series data that matches the pattern.

2. The apparatus according to claim 1, wherein the extractor extracts a relationship between the substance and the property.

3. The apparatus according to claim 2, wherein the industrial product comprises a semiconductor device, and the property comprises mobility of a carrier and a type of the carrier.

4. The apparatus according to claim 3, wherein the matcher determines that the time series data matches the pattern if an extracted number of hole mobilities in the time series data is greater than a first threshold and an extracted number of electron mobilities in the time series data is greater than a second threshold.

5. The apparatus according to claim 3, wherein the matcher determines that the time series data matches the pattern if variance of mobilities of at least one of a hole and an electron in the time series data is equal to or less than a threshold.

6. The apparatus according to claim 3, wherein the matcher determines that the time series data matches the pattern if an extracted number of hole mobilities in the time series data, associated with experimental conditions satisfying a first criteria, is greater than a first threshold and an extracted number of electron mobilities in the time series data, associated with experimental conditions satisfying a second criteria, is greater than a second threshold.

7. The apparatus according to claim 6, wherein at least one of the first criteria and the second criteria defines that at least one of a usage environment temperature and a manufacturing temperature of the substance falls within an allowable range.

8. The apparatus according to claim 1, wherein the pattern relates to a numerical value of the time series data.

9. The apparatus according to claim 1, wherein the pattern relates to a shape of a curve obtained by plotting the time series data.

10. The apparatus according to claim 1, further comprising a visualizer implemented by one or more hardware processors which highlights the time series data that matches the pattern.

* * * * *